United States Patent
Sherman

(10) Patent No.: US 6,707,802 B1
(45) Date of Patent: Mar. 16, 2004

(54) METHOD AND APPARATUS FOR CODE DIVISION SWITCHING OF COMMUNICATION SIGNALS BY TRUNK CODING

(75) Inventor: Matthew J. Sherman, Succasunna, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/469,784

(22) Filed: Dec. 22, 1999

(51) Int. Cl.[7] ............................................. H04B 7/204
(52) U.S. Cl. .................... 370/325; 370/320; 455/13.1
(58) Field of Search ................................. 370/320, 325, 370/342, 335, 315, 316, 441; 455/12.1, 13.1

(56) References Cited

U.S. PATENT DOCUMENTS

| | | | |
|---|---|---|---|
| 5,805,579 A | 9/1998 | Erving et al. | 370/320 |
| 5,815,527 A | 9/1998 | Erving et al. | 375/206 |
| 5,878,037 A | 3/1999 | Sherman | 370/335 |
| 5,940,379 A | * 8/1999 | Startup et al. | 370/320 |
| 6,144,654 A | * 11/2000 | Ibanez-Meier et al. | 370/342 |

* cited by examiner

*Primary Examiner*—Charles Appiah
*Assistant Examiner*—James Moore

(57) ABSTRACT

A method provides for trunk group satellite switching using a code division multiple access (CDMA) scheme. The method includes receiving inbound satellite beams carrying individually encoded user signals including a plurality of inbound trunk groups, processing and mapping the trunk group elements to a plurality of outbound trunk groups, routing the outbound trunk groups to appropriate outbound satellite beams and transmitting the outbound beams based on common destination parameters. The trunk group switching allows for a reduction of on-board switching complexity, volume, and costs.

7 Claims, 3 Drawing Sheets

METHOD AND APPARATUS FOR CODE DIVISION SWITCHING OF COMMUNICATION SIGNALS BY TRUNK CODING

BACKGROUND OF THE INVENTION

1. Field of the Invention

The present invention relates generally to a switching apparatus and method to be used in a communication switching system. It particularly relates to a trunk group switching technique to be used in a satellite communication switching system carrying wide-band signals that uses a code division multiple access (CDMA) scheme and a code division switch on-board the satellite.

2. Background Art

In typical satellite communication systems, the on-board switching equipment primarily comprises a system which acts to receive and then re-transmit user signals to an appropriate destination commonly referred to as a bent-pipe system. The satellite generally acts as a signal relay point to route user signals from a terrestrial origination to a terrestrial destination wherein all pertinent communication switching is performed on the ground. To accomplish actual on-board switching for a plurality of user signals, the complexity of the satellite design quickly multiplies by requiring a digital receiver element for each user signal (call). This hardware requirement greatly increases payload and launch costs, and may limit the number of users that can be supported by a satellite switching platform. The same need to limit equipment cost and size may exist in other communication platforms (e.g., wireless, cellular, land mobile radio, etc).

There is a need to provide a seamless, flexible satellite communication system that can provide desired user services with high performance while keeping satellite design complexity and equipment costs to a minimum.

SUMMARY OF THE INVENTION

The present invention provides a method and apparatus for reducing satellite on-board switching complexity to increase overall system performance in a wideband satellite communication system. The present invention overcomes the previously mentioned disadvantages by providing a trunk-coded satellite switching system wherein inbound satellite beams carrying individually encoded user signals that are trunk-coded are advantageously received, processed, and routed to appropriate outbound satellite beams transmitted based on a mapping scheme. The trunk-coded switching allows for a reduction of on-board switching complexity, volume, and costs. One embodiment of the present invention takes advantage of orthogonal coding to perform trunk processing of inbound satellite beams.

DETAILED DESCRIPTION

The present invention discloses a method and apparatus for code division switching of communication signals using a trunk-coded technique. Advantageously, the code division switching occurs in a satellite communication system environment wherein the switching occurs at a processing frequency using individually encoded user signals (narrowband user traffic codes and signals), wideband cover codes (e.g., psuedo noise or Gold codes), and trunk-coding (e.g., orthogonal Walsh or Quadratic Residue codes) to improve system performance. This processing frequency may be any appropriate frequency enabling switching of received satellite beams including, but not limited to an intermediate frequency (IF), an analog frequency, or a digital baseband frequency. Gold codes change the properties of the signal by whitening the signal spectrum. Specifically, Gold codes make the signal spectrum more evenly distributed in frequency so that it appears more like "white noise".

The present invention of trunk coding enables switching at the processor frequency therein making the plurality of access and modulation schemes creating the embedded narrowband user signals effectively transparent to the satellite switch while still allowing groups of users (trunk-code groups) to be switched efficiently. Alternative code division switching techniques are disclosed in U.S. Pat. Nos. 5,815,527 (Erving et al.) and 5,878,037 (Sherman). U.S. Pat. No. 5,815,527 is herein incorporated by reference.

The trunk code provides sub-channeling within each beam to identify blocks of users and associate the user with a particular outbound beam, preferably assigned at call setup, thereby reducing satellite on-board switching complexity. Preferably, the communication switching system uses CDMA/spread spectrum modulated beams for inbound and outbound satellite beams. Also, it is noted that particular non-critical aspects of RF transmission and receiving processing are not described in great detail as they are not critical to the present invention and these aspects are well-known in the relevant field of invention.

Figure 1:
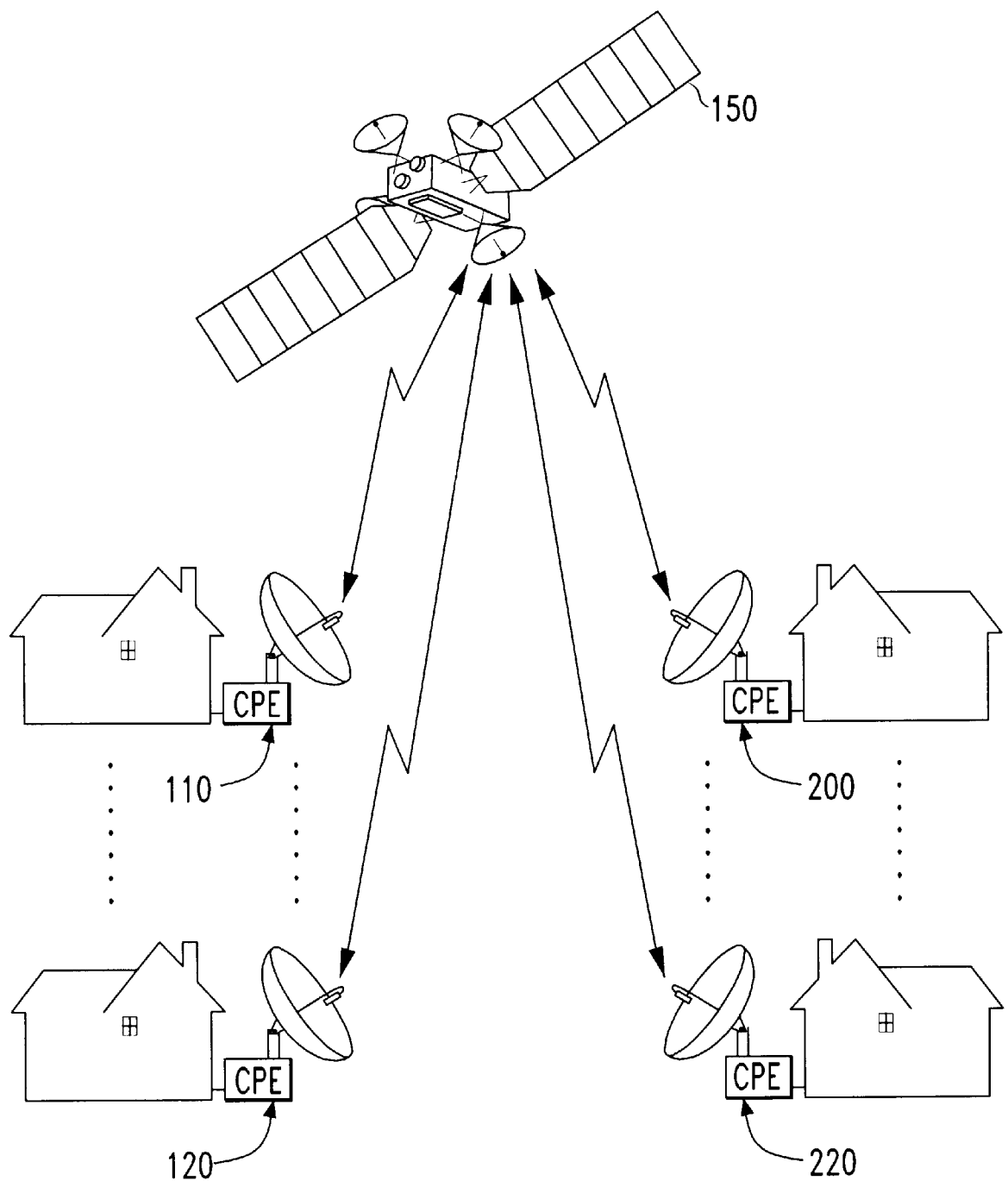
FIG. 1 illustrates an embodiment of the present invention showing a representative satellite communication system

With reference to FIG. 1, a representative satellite communication system 100 using the present invention is shown. The typical communication path within system 100 include an inbound (uplink) communication path and outbound (downlink) communication path wherein the inbound path comprises signals transmitted by ground users and received by communication satellite 150, and the outbound path comprises signals transmitted by communication satellite 150 to ground users. As commonly operated within the system 100, communication satellite 150 acts as a switching point to switch data signals received on a plurality of inbound satellite beams to appropriate outbound satellite beams for subsequent transmission. Satellite 150 includes an antenna system designed to receive the plurality of inbound beams and transmit the corresponding outbound beams wherein each inbound and outbound satellite beam represent a different coverage area of the satellite communication system 100. Typically, different coverage areas of the communication system may overlap to ensure ubiquitous communication service.

Origination Customer Premises Equipment (CPE) 110 and 120 are shown as a representative sample of the plurality of origination CPE that may exist within an actual satellite communication system. The CPE advantageously includes a satellite dish for transmitting and receiving communication signals from an orbital satellite switching point. Typically, each originating CPE will be located in a different satellite coverage area, although multiple CPE's may be located within the same coverage area. At each originating CPE located within a satellite coverage area, a user data signal is modulated with a user code (narrowband user traffic/ spreading code), modulated with a trunk code, and then modulated with a beam code before conventional RF processing for inbound wideband signal transmission to the satellite 150.

The user code helps identify a particular user signal, the trunk code helps identify a group of individual user signals (a trunk group), and the beam code helps associate a group of user signals with a particular inbound or outbound satellite beam and control interference from adjacent beams. The wide-band trunk code (e.g., a CDMA waveform) isolates groups of users (trunks) from each other allowing the underlying narrowband user code (e.g., waveform) to be transparent to the receiving satellite. In a particular embodiment, this further enables the satellite to switch the inbound beams at a higher than baseband processing frequency (e.g., IF) and therefore never require the satellite switch to decode the underlying access and modulation schemes used for the user signals.

Different trunk codes are used to encode the user signals of different inbound trunk groups. The use of different trunk codes for different trunk groups uniquely identifies each user signal within that trunk group with a particular user. Each inbound beam may advantageously include a plurality of trunk groups to help facilitate on-board satellite switching. A set of trunks that share the same beam code would be termed a beam group. The beam code typically is a short code comprising two or four bits which doubles or quadruples the bandwidth of the signal. It is noted that use of a beam code is not a critical element to the present invention, and it's primary purpose is to help control interference between adjacent beams.

It is noted that although FIG. 1 shows a residential user, the present invention is not thus limited and can be applied to any satellite communication user (e.g., business or commercial user).

Figure 2:
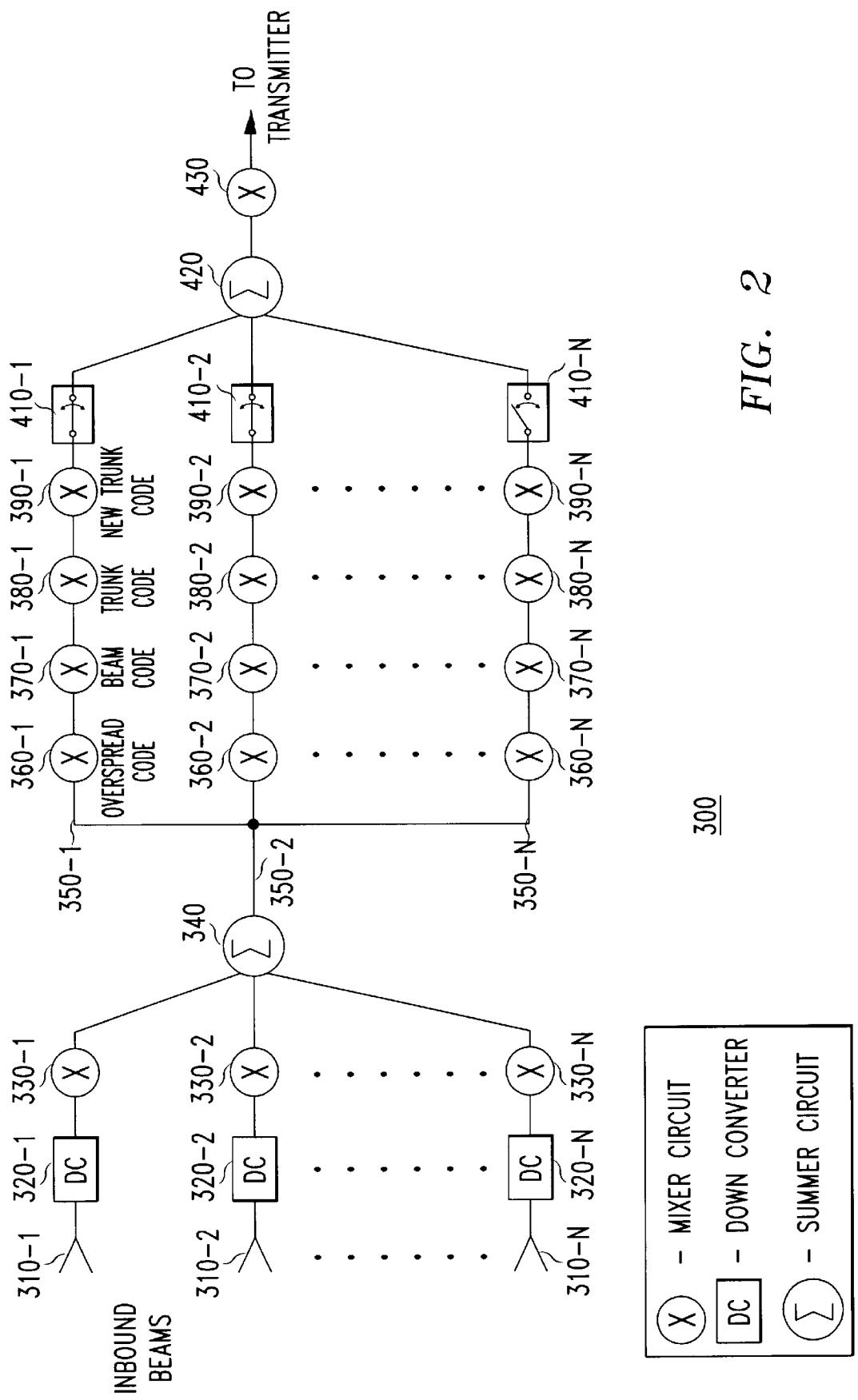
FIG. 2 is a block diagram of an on-board switch in an embodiment of the present invention

FIG. 2 represents a first preferred embodiment of the present invention by showing a block diagram of the satellite on-board switch 300. A plurality of inbound communication beams (310-1 to 310-N), transmitted by the originating CPEs, are received by the satellite receiver and downconverted to a processing frequency (e.g., IF, analog, or digital baseband frequency) from the received radio frequency (RF) by the corresponding plurality of downconverters (320-1 to 320-N). After the process of downconversion, the inbound beams are advantageously overspread using mixer circuits (330-1 to 330-N). Over-spreading increases the bandwidth of the beam signal beyond the original bandwidth of the beam signal received by the satellite allowing multiple beam signals to share the same communications line during further signal processing. The over-spreading codes are applied to the inbound beams to separate the inbound beams for subsequent processing enabling the beams to pass through the CDMA switch 300 without interfering with other signals in the switch 300. This step of overspreading further allows for subsequent separation of trunk groups from different beams. The over-spreading code is preferably an orthogonal Walsh code, but can also include some other form of orthogonal or semi-orthogonal coding. When a beam code is employed, advantageously some beam groups can use the same overspreading code and still not interfere with each other. In this implementation, the group of beams sharing the same overspreading code would be termed a switch group.

Following the process of over-spreading, the plurality of beams are combined together in a summing circuit 340 forming a summation wideband signal which carries all the information to be subsequently switched. Following summation, the combined signal is carried and distributed to a plurality of downlink trunk processors 350-1 to 350-N.

Each trunk processor includes a trunk switch 410-1 to 410L 410-N to isolate trunk processors 350-1 to 350-N which are inactive from the downlink. Although two trunk switches are shown as closed in the diagram, one skilled in the art will appreciate that any number of trunks may be dynamically selected at any time during on-board processing to facilitate better system performance. As noted before, each inbound satellite beam includes a plurality of individually encoded user signals carrying a user traffic code, a trunk code, and a beam code. Correspondingly, each trunk processor includes processing equipment for decoding each particular aspect of the inbound beam except the user traffic code. The trunk processor equipment includes a first mixer to decode the overspreading code, a second mixer to decode the beam code, a third mixer to decode the inbound trunk code, and a fourth mixer to apply an outbound trunk code. Although four mixers are presently disclosed and shown in FIG. 2 for these communication processing steps, those skilled in the art will appreciate that a greater or lesser number of mixers may be used to achieve the same function and results as four mixers. Advantageously, filtering (not shown) is applied after each mixing step.

With further reference to FIG. 2, the communication processing occurring on a selected trunk processor is disclosed. The signal carrying the inbound trunk group comes to a first mixer 360-1 to 360-N. The first mixer 360-1 to 360-N applies a dispreading code, preferably a Walsh code, to the overspread beam group signal to recover the switch group associated with the trunk desired for processing. The processing of dispreading returns the beam group signal to its original bandwidth as the uplink beam group signal was received by the satellite which helps prevent overlap of adjacent inbound beams and enables the satellite switch 300 to extract the necessary information needed to produce an outbound satellite beam carrying outbound trunk groups. Following the step of dispreading, a second mixer 370-1 to 370-N is used to remove (decode) the beam code to extract the beam group associated with the desired trunk. Subsequently, a third mixer 380-1 to 380L 380-N is used to remove (decode) the trunk code leaving the plurality of user signals in the desired trunk. Following this step, for those inbound trunk groups selected (the trunk switch is closed), a fourth mixer 390-1 to 390-N is used to apply a second trunk code to the plurality of users signals associating this group of users with a particular outbound trunk based on a mapping established by a network switch controller (not shown) which is controlled by a network operations control center ("NOCC"). Advantageously, the second trunk code respreads the beam signal (increases bandwidth from the underlying narrowband user signals) to isolate the outbound trunk group from other trunk groups (received on the same uplink beam or other uplink beams) from other trunk groups that must share the same outbound beam. Once the inbound-to-outbound trunk group mapping is programmed into the network switch controller by the NOCC, the switching can be performed independently at the satellites based on the incoming beam including a plurality of trunk groups. Preferably, this independent switching to outbound trunk groups is based on the trunk codes of inbound trunk groups.

This outbound trunk group is routed to a particular outbound beam path and combined via a summer circuit 420 with other outbound trunk groups to form an outbound beam group to be carried on the same outbound beam. Following this step of summation of the plurality of outbound trunk groups on to a particular outbound beam, a second beam code is applied using a fifth mixer 430 based on the outbound beam path, and the beam is then transmitted on the particular outbound path after conventional RF processing to a plurality of destination CPE's 200. In particular applications, the interference suppression provided by a beam code may be achieved by other means that include, but are not limited to frequency division multiplexing, time division multiplexing, etc. In such applications, the beam group is transmitted without using a beam code. Although not shown in FIG. 2, those skilled in the art will appreciate that conventional RF processing components such as filters and amplifiers may be easily added to the on-board equipment but are not critical to practicing the present invention. Also, although the on-board communication processing has been described using a single satellite transponder example, the above-mentioned processing can occur over a multiple number of transponders resulting in a plurality of different outbound satellite beams.

Generally, the communication switching system operations is advantageously controlled using a terrestrial network operations control center (NOCC). The NOCC, via the network switch controller, would assign particular codes and dynamically (on demand) select the number and composition of particular inbound trunk groups for subsequent processing and outbound transmission. An asynchronous orderwire can be used at initiation of user service to establish synchronization prior to issuing a narrowband traffic code. Also, the NOCC ensures that no two users using the same inbound or outbound signal beam and trunk code are using the same narrowband traffic code.

Figure 3:
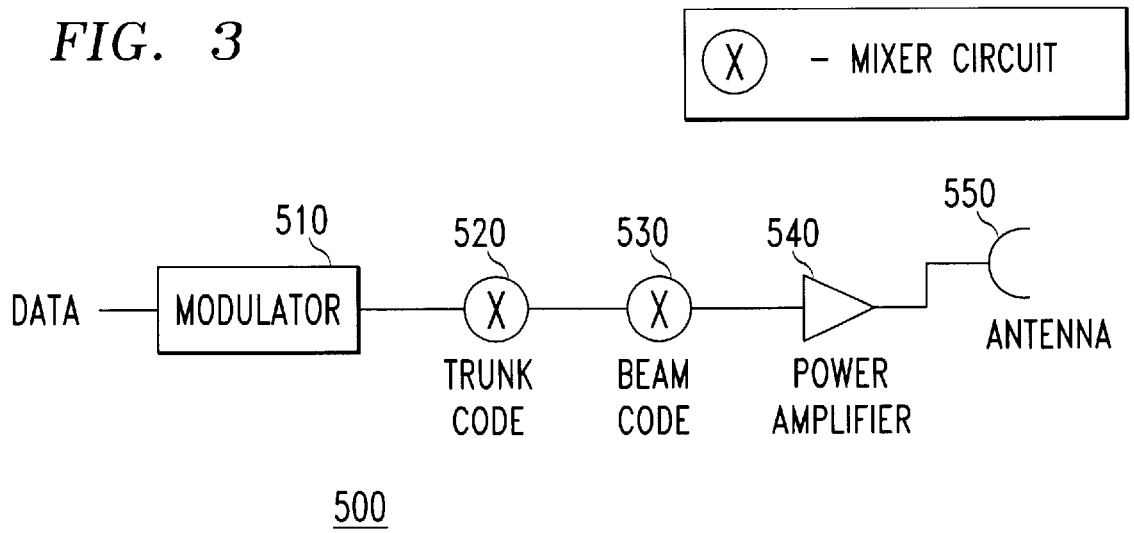
FIG. 3 is a block diagram of originating customer premises equipment in a system according to an embodiment of the present invention

With reference to FIG. 3, the components of an originating CPE 500 are shown. An incoming data stream is modulated with a user code (e.g., narrowband traffic channel code) using a modulator 510. The modulation type may be any suitable technique including QPSK, BPSK, QAM, or direct sequence spreading (CDMA). Also, the narrowband coding scheme can include a wide range of different coding techniques. In a preferred embodiment, the narrowband codes are narrow frequency traffic codes that correspond to different narrowband Fast Fourier Transform (FFT) bins. In alternative embodiments, other narrowband encoding techniques may be used including, but not limited to the following: wavelet transform-based approaches, sub-band approaches, and analog approaches. The narrowband coding ensures that one user's data is separable from other user's data using the same trunk code when the transmission is received by the destination terminal on the downlink.

Following this step of narrowband coding, the user signal is modulated with a trunk code using a first mixer 520 creating a wideband signal. The trunk code may be any suitable coding technique including Walsh, Gold, direct sequence spreading, or another orthogonal or semi-orthogonal coding technique. Subsequently, the user signal is modulated with a beam code (cover code) using a second mixer 530 to associate the user signal with a particular inbound satellite beam. Again, any suitable cover coding technique may be used (e.g., Gold coding). A preferred embodiment uses direct sequence spreading codes (e.g., CDMA codes).

The beam code controls interference levels to and from other uplink beams. It may use orthogonal, semi-orthogonal, or psuedo-noise coding (among other coding techniques) to achieve this interference control. A preferred embodiment uses short Walsh codes to orthogonalize the interference from neighboring beams, and a psuedo-noise or gold code to control the interference to/from beams which are farther away. The psuedo-noise or Gold code component would not increase the coding rate (bandwidth) of the signal, whereas the Walsh or orthogonal beam code component would increase the rate.

Both mixers 520 and 530 operate at an IF range. After the beam code is applied, conventional RF processing occurs wherein the signal is upconverted from IF to an RF range, filtered, amplified, and subsequently transmitted to a satellite switching point on the particular inbound satellite beam path. Amplification and RF transmission are is performed using amplifier 540 and antenna 550 respectively.

Figure 4:
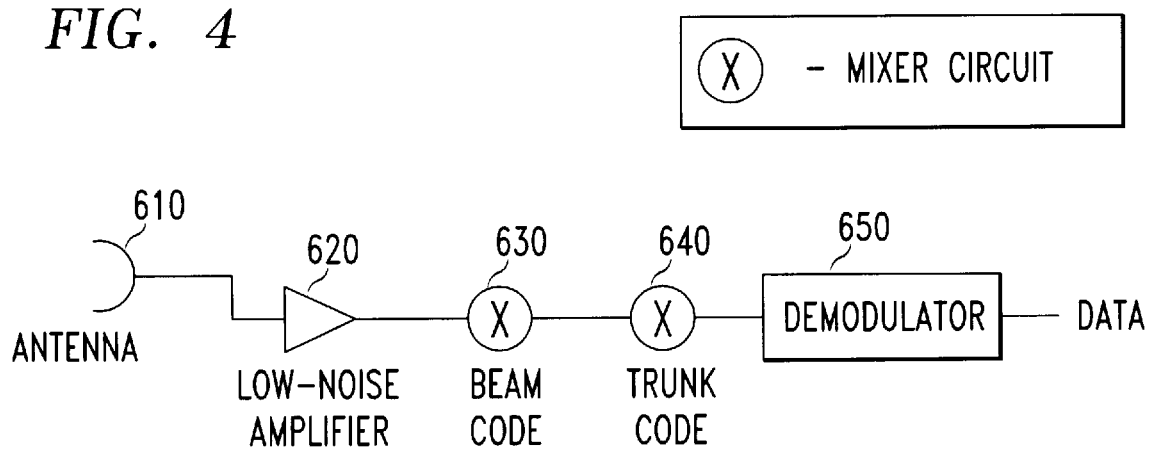
FIG. 4 is a block diagram of destination customer premises equipment in a system according to an embodiment of the present invention.

With reference to FIG. 4, the components of a destination CPE 600 are shown. Antenna 610 receives the outbound satellite communication beam carrying a beam group code, trunk group code, and a plurality of individually encoded user signals. After the received beam signal is downconverted from an RF frequency to a processing (e.g., baseband) frequency and passes through low noise amplifier 620, the beam code is removed (decoded) helping to uniquely identify the particular received beam using a first mixer 630. Those skilled in the art will appreciate that an alternative embodiment could be implemented wherein the received RF signal is downconverted to IF instead of baseband for subsequent communication processing. Downconverting to baseband permits the use of less complex and less expensive components for the processing of the received signal.

A second mixer 640 removes (decodes) the trunk code leaving the plurality of encoded user signals in the desired trunk group. Subsequently, a demodulator 650 demodulates the plurality of user signals by applying a particular user code to filter out other user signals and extract the desired original data stream carried by the RF communication signal. The demodulator uses a demodulation scheme corresponding to that used at the originating CPE (e.g., QPSK, BPSK, QAM, CDMA, etc).

As can be understood by those skilled in the art, the designation of originating and destination CPE are not rigid and these roles will commonly be reversed back and forth in actual system operation wherein interactive communication is occurring.

Although the present invention has been described using a CDMA satellite communication system embodiment, it will be appreciated by those skilled in the art that modifications and changes may be made without departing from the spirit and scope of the present invention. As such, the method and apparatus described herein may be equally applied to a wired, optical, or terrestrial wireless communication network.

What is claimed is:

1. A method for simultaneous code division switching of groups of individual signals, comprising receiving a plurality of inbound communication beams at a communication switch, wherein each beam carries a plurality of inbound trunk groups, and each inbound trunk group carries a plurality of individually encoded signals;

processing each inbound beam to a frequency for switch processing;

combining said processed beams into a summation signal;

distributing each processed beam, carried by said summation signal, to a different one of a plurality of trunk processors;

decoding one of said plurality of processed beams into at least one beam group and at least one trunk group, wherein said trunk group includes a plurality of individually encoded signals;

applying a pre-determined trunk code to said plurality of individually encoded signals included within said decoded trunk group to obtain at least one outbound trunk group, wherein the trunk code is selected to isolate said outbound trunk group from any other outbound trunk groups;

generating an outbound communication beam including a plurality of outbound trunk groups, wherein said outbound trunk groups are grouped based on a common destination parameter.

2. The method of claim 1, further comprising:

coding each inbound beam to allow coexistence with other beams during the switch processing; and applying a beam code to said outbound communication beam.

3. The method of claim 2, wherein:

said step of coding includes applying an orthogonal code.

4. The method of claim 3, wherein:

said orthogonal code is a Walsh code.

5. The method of claim 1, wherein:

said step of distributing includes switching at least one of said plurality of inbound trunk groups on to a particular connection to generate said outbound communication beam.

6. An apparatus for simultaneous code division switching of groups of individual signals, comprising:

a receiver for receiving a plurality of inbound communication beams, each beam carrying a plurality of individually encoded signals including a plurality of inbound trunk groups;

a downconverter for downconverting each inbound beam to a processing frequency;

a first mixer circuit for encoding said downconverted beams to reduce interference between said beams when combined;

a first summing circuit for combining said downconverted beams into a summation signal;

a demultiplexer for separating said summation signal into a plurality of inbound trunk groups;

a second mixer circuit and a third mixer circuit for decoding one of said plurality of inbound trunk groups into a plurality of individually encoded signals including a first trunk group;

a fourth mixer circuit for applying a pre-determined trunk code to said plurality of individually encoded signals to obtain an outbound trunk group;

a second summing circuit for including said outbound trunk group in a plurality of outbound trunk groups to obtain an outbound communication beam; and a transmitter for transmitting said outbound communication beam, wherein said individually encoded signals are grouped into trunk groups based on a common destination parameter.

7. The apparatus of claim 6, wherein:

said plurality of individually encoded signals includes a beam group; and said apparatus includes a fifth mixer circuit for applying a beam code to said outbound communication beam.

* * * * *